United States Patent Office 3,657,366
Patented Apr. 18, 1972

3,657,366
AGENT FOR PREVENTING ISOMERIZATION OF DICHLOROBUTENE
Ryuichi Kobayashi, Takao Iwasaki, Junji Hirano, and Hideki Matsumura, Ohmi-machi, Japan, assignors to Denki Kagaku Kogyo Kabushiki Kaisha, Tokyo, Japan
No Drawing. Continuation-in-part of application Ser. No. 752,473, Aug. 14, 1968. This application Aug. 24, 1970, Ser. No. 66,612
Int. Cl. C07c *17/42*
U.S. Cl. 260—652.5 R                                   1 Claim

ABSTRACT OF THE DISCLOSURE 3,4-dichlorobutene-1 and 1,4-dichlorobutene-2 are useful intermediates in chemical industry. However, 3,4-dichlorobutene-1 and 1,4-dichlorobutene-2 are isomerized into one another during the storage or in such a step as distillation and an undesirable isomer is increased. Such an undesirable isomerization is prevented by adding an ammonium salt of a carboxylic acid as a stabilizer.

---

The present invention relates to an agent for preventing an isomerization of a dichlorobutene.

This application is a continuation-in-part of the copending application Ser. No. 752,473 filed Aug. 14, 1968 and now abandoned.

The term "dichlorobutene" used herein means 3,4-dichlorobutene-1 or 1,4-dichlorobutene-2 or a mixture thereof. The dichlorobutene is usually produced as a mixture of 3,4-dichlorobutene-1 and 1,4-dichlorobutene-2 through chlorination of butadiene. There has been well-known a method for isomerizing one dichlorobutene of the thus obtained mixture into another dichlorobutene. For instance, there is described in U.S. Pat. No. 2,242,084 that the isomerizaiton is carried out in the presence of a catalyst consisting of chlorides of aluminum, iron and the like. Thus, the composition of the above described mixture system reaches to an equilibrium value, which depends upon the environment conditions. This equilibrium value varies depending upon an environment temperature, but the composition of the mixture system has 3,4-dichlorobutene-1 of 15 to 30% and 1,4-dichlorobutene-2 of 85 to 70% at a temperature ranging between room temperature and 150° C. If any one of dichlorobutenes is desired, such a desired dichlorobutene can easily be obtained in a pure form by separating and recovering it out of the mixture system, for example, by distillation while isomerizing another dichlorobutene into the desired dichlorobutene. The thus produced dichlorobutene is a useful commercial material. For instance, 3,4-dichlorobutene-1 is an important intermediate in production of chloroprene, by means of dehydrochlorination. On the other hand, 1,4-dichlorobutene-2 is an important intermediate in production of hexamethylenediamine and tetrahydrofuran.

Therefore, in accordance with such an application purpose, any one of dichlorobutenes is isomerized into another dichlorobutene, and then resulting isomerized dichlorobutene is used in a pure form. For instance, 1,4-dichlorobutene-2 in a mixture of 3,4-dichlorobutene-1 and 1,4-dichlorobutene-2 is isomerized into 3,4-dichlorobutene-1, which is used as a raw material for production of chloroprene.

However, the thus obtained pure dichlorobutene is again isomerized partially into an undesirable another dichlorobutene during the storage or in a heat treatment, for example, in distillation. In this undesirable isomerization reaction, metal chlorides act as a catalyst. Among these metal chlorides, ferric chloride having a high catalytic activity, which is apt to exist in the system due to corrosion, is particularly a problem. When ferric chloride is existent even in a trace amount in dichlorobutene, the above-mentioned undesirable isomerization reaction occurs. When the undesirable isomerization reaction occurs, the purity of the desired dichlorobutene not only lowers but also, in some cases, an extremely serious disadvantage is brought about. For instance, when 3,4-dichlorobutene-1 is dehydrochlorinated to produce chloroprene, 1,4-dichlorobutene-2 mixed therein is dehydrochlorinated into 1-chlorobutadiene-1,3 which is an isomer of chloroprene (2-chlorobutadiene-1,3). If 1-chlorobutadiene-1,3 is present in the polymerization of chloroprene, it is injurious to physical properties of the resulting polychloroprene. Consequently, it is necessary to remove 1-chlorobutadiene-1,3 and impose a heavy burden on purification of chloroprene.

In order to prevent the undesirable isomerization of dichlorobutene, various isomerization preventing agents, that is, stabilizers have been previously proposed and the typical agents are mercaptans, pyrogallol, p-phenylenediamine and the like. However, these stabilizers are not sufficient in the stabilizing effect and, for instance, if a trace amount of a catalytic substance such as ferric chloride is present, the isomerization reaction into undesirable dichlorobutene proceeds even in the presence of such stabilizers. Accordingly, stabilizers having a larger preventability than the conventional stabilizer have been desired.

An object of the present invention is to provide agents for preventing an isomerization of dichlorobutene, that is, stabilizers having more excellent preventability than the conventional stabilizer, which do not cause danger nor corrosion.

Another object of the present invention is to provide a dichlorobutene composition stabilizer by such an isomerization preventing agent.

The stabilizers of the present invention, which attain such objects, are ammonium salts of carboxylic acids selected from the group consisting of ammonium acetate, ammonium propionate, ammonium n-butyrate, ammonium isobutyrate, ammonium trimethylacetate and ammonium citrate.

The stabilizers of the present invention are added immediately after isomerization and separation of the desired pure dichlorobutene. An amount of said stabilizer to be used varies depending upon the kind of stabilizer, the temperature of the reaction system and an amount of metal chloride, but is from about 0.01 to about 1.00% by weight based on dichlorobutene. When the amount is less than 0.01%, the preventability is not sufficient and the content of undesirable dichlorobutene increases. In the case of more than 1.00%, the preventability is no longer increased and further such a large amount of the stabilizer is not preferable in view of economical points, because the stabilizers may have to be again removed when dischlorobutene is used as a raw material in the subsequent step and the loss of the stabilizer is large.

The invention will be further explained in detail by the following examples. The part and percent used in examples mean by weight unless otherwise specified. Further, the rate of increase of dichlorobutene (hereinafter abbreviated as DCB) is calculated according to the following equation based on the data obtained by gas chromatography:

Rate of increase of 1,4-DCB-2 (percent)

$$= \frac{\left(\begin{array}{c}\text{amount of 1,4-DCB-2} \\ \text{after the heating}\end{array}\right) - \left(\begin{array}{c}\text{amount of 1,4-DCB-2} \\ \text{before the heating}\end{array}\right)}{(\text{amount of 3,4-DCB-1 before the heating})} \times 100$$

Rate of increase of 3,4-DCB-1 (percent)

$$= \frac{\left(\begin{array}{c}\text{amount of 3,4-DCB-1} \\ \text{after the heating}\end{array}\right) - \left(\begin{array}{c}\text{amount of 3,4-DCB-1} \\ \text{before the heating}\end{array}\right)}{(\text{amount of 1,4-DCB-2 before the heating})} \times 100$$

EXAMPLE 1

Into a glass vessel a dichlorobutene mixture containing 98.5% of 3,4-dichlorobutene-1 and 0.12% of 1,4-dichlorobutene-2 was introduced and 0.1% based on dichlorobutene of ferric chloride as an isomerization catalyst and 0.5% based on dichlorobutene of the stabilizer as shown in the following Table 1 were added thereto and the resulting mixture was heated at 130° C. for 2 hours. After the heating, ferric chloride was removed and the product was analysed by gas chromatography to determine the rate of increase of 1,4-dihcolorobutene-2 according to the above described equation. For the comparison, the similar experiments were carried out using no stabilizer or the conventional stabilizers. The obtained results are shown in the following Table 1.

EXAMPLE 3

The same experiments as described in Example 1 were repeated by using the same dichlorobutene mixture as used in Example 1 and 0.1% based on dichlorobutene of ferric chloride as an isomerization catalyst except that ammonium acetate was used as a stabilizer in an amount of 0.01%, 0.05%, 0.1% and 1.0% based on dichlorobutene, respectively. The obtained results are shown in the following Table 3.

TABLE 3

| Ferric chloride (percent) | Ammonium acetate (percent) | Composition of DCB after the heating (percent) | | Rate of increase of 1,4-DCB-2 (percent) |
|---|---|---|---|---|
| | | 3,4-DCB-1 | 1,4-DCB-2 | |
| 1... 0.1 | 0.01 | 97.0 | 1.55 | 1.45 |
| 2... 0.1 | 0.05 | 97.8 | 0.52 | 0.41 |
| 3... 0.1 | 0.1 | 98.1 | 0.34 | 0.22 |
| 4... 0.1 | 1.0 | 98.2 | 0.29 | 0.17 |

EXAMPLE 4

The same experiments as described in Example 2 were repeated by using the same dichlorobutene mixture as used in Example 2 and 0.1% based on dichlorobutene of ferric chloride as an isomerization catalyst except that ammonium acetate was used as a stabilizer in an amount of 0.01%, 0.05%, 0.1% and 1.0% based on dichloro-

TABLE 1

| | Ferric chloride (percent) | Stabilizer | Composition of DCB after the heating (percent) | | Rate of increase of 1,4-DCB-2 (percent) |
|---|---|---|---|---|---|
| | | | 3,4-DCB-1 | 1,4-DCB-2 | |
| Comparative example: | | | | | |
| 1 | None | None | 97.0 | 1.61 | 1.51 |
| 2 | 0.1 | ....do | 46.0 | 52.50 | 53.18 |
| 3 | 0.1 | n-Dodecylmercaptan | 95.5 | 3.00 | 2.92 |
| 4 | 0.1 | p-Phenylenediamine | 97.3 | 1.23 | 1.13 |
| 5 | 0.1 | Pyrogallol | 97.6 | 0.93 | 0.82 |
| Example: | | | | | |
| 6 | 0.1 | Ammonium acetate | 98.2 | 0.26 | 0.14 |
| 7 | 0.1 | Ammonium citrate | 98.0 | 0.44 | 0.32 |
| 8 | 0.1 | Ammonium n-butyrate | 98.0 | 0.46 | 0.35 |
| 9 | 0.1 | Ammonium isobutyrate | 97.8 | 0.56 | 0.45 |
| 10 | 0.1 | Ammonium propionate | 97.8 | 0.68 | 0.57 |
| 11 | 0.1 | Ammonium trimethylacetate | 97.7 | 0.77 | 0.66 |

EXAMPLE 2

Into a glass vessel a dichlorobutene mixture containing 97.2% of 1,4-dichlorobutene-2 and 0.21% of 3,4-dichlorobutene-1 was introduced and 0.1% based on dichlorobutene of ferric chloride and 0.5% based on dichlorobutene of the stabilizer as shown in the following Table 2 were added thereto and the resulting mixture was heated at 130° C. for 2 hours. After the heating, the product was analysed by gas chromatography to determine the rate of increase of 3,4-dichlorobutene-1 according to the above described equation. The obtained results are shown in the following Table 2.

butene, respectively. The obtained results are shown in the following Table 4.

TABLE 4

| Ferric chloride (percent) | Ammonium acetate (percent) | Composition of DCB after the heating (percent) | | Rate of increase of 3,4-DCB-1 (percent) |
|---|---|---|---|---|
| | | 3,4-DCB-1 | 1,4-DCB-2 | |
| 1... 0.1 | 0.01 | 0.78 | 96.6 | 0.58 |
| 2... 0.1 | 0.05 | 0.43 | 97.0 | 0.23 |
| 3... 0.1 | 0.1 | 0.33 | 97.1 | 0.12 |
| 4... 0.1 | 1.0 | 0.28 | 97.1 | 0.07 |

TABLE 2

| | Ferric chloride (percent) | Stabilizer | Composition of DCB after the heating (percent) | | Rate of increase of 3,4-DCB-1 (percent) |
|---|---|---|---|---|---|
| | | | 3,4-DCB-1 | 1,4-DCB-2 | |
| 1 | 0.1 | None | 18.88 | 78.5 | 19.21 |
| 2 | 0.1 | Ammonium acetate | 0.29 | 97.1 | 0.08 |
| 3 | 0.1 | Ammonium citrate | 0.36 | 97.0 | 0.15 |
| 4 | 0.1 | Ammonium n-butyrate | 0.35 | 97.1 | 0.14 |
| 5 | 0.1 | Ammonium isobutyrate | 0.41 | 97.0 | 0.21 |
| 6 | 0.1 | Ammonium propionate | 0.51 | 96.9 | 0.32 |
| 7 | 0.1 | Ammonium trimethylacetate | 0.60 | 96.8 | 0.42 |

What is claimed is:

1. A composition comprising 1,4-dichlorobutene-2 and 3,4-dichlorobutene-1 containing from about 0.01 to about 1.00% by weight, based on the dichlorobutenes, of a material which prevents the isomerization of 1,4-dichlorobutene-2 into 3,4-dichlorobutene-1 and the isomerization of 3,4 - dichlorobutene - 1 into 1,4- dichlorobutene-2, selected from the group consisting of ammonium acetate, ammonium propionate, ammonium n-butyrate, ammonium isobutyrate, ammonium trimethylacetate and ammonium citrate.

References Cited
UNITED STATES PATENTS 3,015,679   1/1962   Bellringer _____ 260—652.5 R HOWARD T. MARS, Primary Examiner